United States Patent [19]

Moorer

[11] 4,088,505
[45] May 9, 1978

[54] ANIONIC BITUMINOUS EMULSIONS
[75] Inventor: Howard H. Moorer, Charleston, S.C.
[73] Assignee: Westvaco Corporation, New York, N.Y.
[21] Appl. No.: 652,721
[22] Filed: Jan. 27, 1976

Related U.S. Application Data

[63] Continuation-in-part of Ser. No. 452,018, Mar. 18, 1974, Pat. No. 3,956,002.

[51] Int. Cl.$^2$ .................. C08L 95/00; G09D 3/24
[52] U.S. Cl. .................................. 106/277; 106/278; 106/283; 252/311.5
[58] Field of Search ............. 106/277; 252/311.5

[56] References Cited

U.S. PATENT DOCUMENTS

| | | | |
|---|---|---|---|
| 2,080,689 | 5/1937 | Bray et al. ........................ | 252/311.5 |
| 2,119,732 | 6/1938 | Beckwith et al. ................ | 252/311.5 |
| 2,216,311 | 10/1940 | Davis et al. ...................... | 252/311.5 |
| 3,123,569 | 3/1964 | Borgfeldt ......................... | 106/277 X |
| 3,345,193 | 10/1967 | Pitchford ......................... | 106/277 X |
| 3,432,320 | 3/1969 | Pitchford ......................... | 106/277 |
| 3,594,201 | 7/1971 | Sommer et al. .................. | 106/277 |
| 3,956,002 | 5/1976 | Moorer ............................. | 106/277 |

*Primary Examiner*—Joan E. Welcome
*Attorney, Agent, or Firm*—Richard L. Schmalz; Ernest B. Lipscomb, III; Terry B. McDaniel

[57] ABSTRACT

There is disclosed herein oil-in-water anionic bituminous emulsions which comprise from about 30% to about 75% by weight of the emulsion of bitumen as the dispersed phase, and from about 0.1% to about 10.0% by weight of an anionic emulsifier consisting of an alkali metal salt of an alkali lignin, an ethylene oxide adduct of phenol, and water in an amount to make up 100% by weight as the continuous phase. Additionally, improved pumping times are obtained with the addition of from 1% to about 10% by weight of sodium borate.

15 Claims, No Drawings

ANIONIC BITUMINOUS EMULSIONS

CROSS-REFERENCE TO RELATED APPLICATION

This application is a continuation-in-part of my copending application Ser. No. 452,018, filed Mar. 18, 1974, and now U.S. Pat. No. 3,956,002.

BACKGROUND OF THE INVENTION (1) Field of the Invention

This invention relates to improvements in oil-in-water anionic bituminous emulsions. More particularly, this invention relates to the production of oil-in-water anionic bituminous emulsions with the aid of a particular anionic emulsifying agent comprising an alkali metal salt of an alkali lignin and an ethylene oxide adduct of an alkyl phenol.

(2) The Prior Art

Aggregates for road building are generally coated with suitable asphalt mixes which include bitumens which affect the coating of the aggregates. The aggregates used are, of course, sand, gravel and other suitable and well known aggregates.

To prevent the emulsion from leaving the aggregate, known as "stripping", the asphalt mixes are provided with additives which are usually of either cationic or anionic surfactants. Formulators are continuously attempting to use more effective surfactants of both the cationic and anionic varieties. Although satisfactory results can be obtained with certain types of both surfactants, certain deficiencies, both as to performance and price, leave room for considerable advancement in this field.

The use of lignin-type materials, specifically lignin amines for use in anionic bituminous emulsions, are disclosed in U.S. Pat. No. 3,123,569 to M. J. Borgfeldt. Further, it is also known to use ethers formed from ethylene oxide and nonyl phenol as surfactants in bituminous emulsions as disclosed in U.S. Pat. No. 3,366,500 to Kracauer. However, no one has shown the advantages obtained by the use of an ethylene oxide adduct of nonyl phenol together with the particular lignin materials of this invention in anionic bituminous emulsions.

Accordingly, it is a general object of the present invention to provide an anionic emulsion for coating aggregates for road building and the like.

Another object of the present invention is to provide an anionic bituminous emulsion for coating aggregates for road building and the like which has universal action, that is, it can be used for all different types of asphalt mixes for the coating of all different types of aggregate.

Other objects, features and advantages of the present invention will be apparent from the foregoing detailed description of the invention.

SUMMARY OF THE INVENTION

It has been found that oil-in-water anionic bituminous emulsions capable of producing satisfactory, mechanically stable mixed with aggregates may be effectively prepared by employing from about 30% to about 75% by weight of the emulsion of bitumen as the disperse phase, from about 0.1% to about 10.0% by weight of an anionic emulsifier comprising, an alkali metal salt of an alkali lignin and an ethylene oxide adduct of alkyl phenol in a weight ratio of 10:1 to 1:10 of lignin to alkyl phenol adduct, with the remainder being water as the continuous phase. Additionally, improved pumping times are obtained with the addition of from 1% to 10% by weight of sodium borate.

DETAILED DESCRIPTION OF THE INVENTION

The anionic emulsifier used in the continuous phase of the oil-in-water emulsions of this invention comprises, a mixture of an alkali metal salt of an alkali lignin and ether formed from ethylene oxide and alkyl phenol in a weight ratio of from 10:1 to 1:10 of lignin to alkyl phenol adduct.

Any of the alkali lignins may be employed in the anionic emulsifier. These lignins are all derived by an alkaline digestion of lignocellulose material. Most commonly they are obtained as by-products from alkaline processes of paper making where sodium hydroxide alone or in combination with sodium sulfide is employed. These lignins are generally referred to as soda and kraft or sulfate lignins after the pulping process used. Such alkali lignins should be employed in the emulsifier in the alkali metal salt form, such as sodium, potassium or lithium. During alkaline pulping, the lignin is dissolved in the pulping liquor, known as black liquor; and the lignin is conventionally recovered therefrom by acid precipitation. Methods of recovering lignin from black liquor are well known, and two of such methods are set forth in U.S. Pat. Nos. 3,048,576 and 2,997,466. Depending upon precipitation conditions, precipitated lignin may be in the form of free acid lignin or a lignin salt. If lignin is precipitated at a pH of about 9 to 10, it is obtained in the form of a salt.

Precipitated lignin is concentrated to form a cake containing about 50% to 60% water which is then dried, generally by spray drying. Lignin has been spray dried for over twenty years; and this method has produced an economical, easily handled product. Alkali metal salts of lignin are used in this invention without modification, and the sodium salt of kraft pine lignin has been found to be preferred.

The other necessary portion of the anionic emulsifier is the adduct formed from the reaction of ethylene oxide and an alkyl phenol. Alkyl phenols are contemplated to include nonyl phenol, octyl phenol and dodecyl phenol, with nonyl phenol being preferred. The adduct may contain from 10 to 100 moles of ethylene oxide per mole of nonyl phenol, but preferably contains from 30 to 50 moles of ethylene oxide per mole of nonyl phenol.

As stated, the lignin salt and alkyl phenol adduct are in a weight ratio of 10:1 to 1:10 of lignin salt to alkyl phenol adduct, preferably the ratio is between 7:3 and 4:6 by weight lignin salt to alkyl phenol adduct.

In preparing the bituminous emulsions of this invention, an aqueous anionic emulsifying solution prepared as described hereinbelow is intimately contacted with a suitable bitumen by a mixing device, such as a colloid mill, which is capable of producing a vigorous shearing action. The bitumen content of the emulsion can range from about 30% to about 75% by weight of the emulsion depending upon the intended use, preferably about 55% to about 65% by weight. The anionic emulsifier is present in the final emulsion in a concentration ranging from about 0.1% to about 10.0% by weight of the emulsion, preferably about 0.5% to about 3.0% by weight of the emulsion.

Additionally, it has been found desirable to add up to 10% by weight of the emulsion, preferably about 1.0% to 5.0%, of sodium borate (borax) to obtain extended pumping times.

It is also desirable to adjust the pH of the emulsion to between 10 and 12, preferably 10.5 to 11.5. When preparing the anionic emulsifier as a liquid, which may contain, for example, a 40% solids concentration, it may be desirable to add up to about 20% by weight of a lower alkyl alcohol having less than 6 carbon atoms, for example, isopropanol, ethanol, etc., which assists in forming a stable emulsifier.

The "bitumen" used in the emulsion may be derived from Venezuela, Mid-Continent, Western and other bitumen sources and also includes, in addition to bitumen, natural asphalt, petroleum oil, still residues of paving grade, plastic residues from coal tar distillation, petroleum pitch, petroleum resins, solutions of such substances like cut-back asphalt, and the like. Practically any asphalt with penetration values ranging from about 40 to about 300 may be emulsified with the aid of the anionic emulsifiers of this invention.

The practice of this invention may be seen in the foregoing examples wherein the anionic emulsifier was used to illustrate its advantages in an oil-in-water anionic bituminous emulsion. In each of these examples, the tests were performed according to ASTM D-244.

EXAMPLE 1

This example shows a series of emulsions using an alkali metal salt of an alkali lignin (Indulin ® C, a product of Westvaco Corporation, is the sodium salt of kraft pine lignin) as the lignin component in the emulsion and various nonyl phenol adducts. As will be seen in the table, a number of emulsions were prepared using varying weight ratios of the lignin salt to the ethylene oxide adduct of nonyl phenol; see Emulsion 1 and Emulsion 7 through 10 wherein the weight ratio of lignin to ethylene oxide adduct of nonyl phenol was varied between 50/50 and 80/20. Emulsions 1 through 3 show emulsions prepared with ethylene oxide adduct of nonyl phenol having various mole additions of ethylene oxide varying from 9.5 to 50 moles of adduct. Additionally, the emulsions were prepared at additive levels of 0.1% up to 1.25% by weight of the total emulsifier which was added to an asphalt, in Emulsions 1 through 3, Humble Asphalt (120/150 penetration value) and in the remaining emulsions of Venezuelan Asphalt (120/150 penetration value). Emulsion 6 was run showing the addition of borax at a 5% level. The results of these emulsions are shown in the table below.

TABLE I

| Emulsion No. | Asphalt Used | Formulation Lignin/Nonyl Phenol Adduct | % | Sieve Test, % Residue | Evap. % Residue | Cement Test | viscosity Saybolt Sec. at 77° F. | Particle Charge Test | pH Soln. | pH Formulation | Pumping Test (sec.) | Emulsion pH | Comments |
|---|---|---|---|---|---|---|---|---|---|---|---|---|---|
| 1 | Humble 120/150 | 50/50 | 1.0 | .06 | 62.4 | pass | — | Negative | — | — | — | — | — |
| 2 | Humble 120/150 | 50/50 | 1.0 | .03 | 62.5 | pass | — | Negative | — | — | — | — | — |
| 3 | Humble 120/150 | 50/50 | 1.0 | .04 | 62.7 | pass | — | Negative | — | — | — | — | — |
| 4 | Ven. 120/150 | 60/40 | 1.25 | .06 | 65.4 | pass | 51.5 | 8→6.6 ma wash off | 10.5 | 9.75 | — | — | — |
| 5 | Ven. 120/150 | 60/40 | 1.25 | .03 | 65.6 | pass | 56.2 | 8→6.85ma wash off | 10.6 | 9.9 | — | — | — |
| 6 | Ven. 120/150 | 60/40 5.0%+Borax | 1.25 | .03 | 63.5 | pass | 34.0 | 8→7.6 ma no wash off | 10.5 | 10.05 | — | — | — |
| 7 | Ven. 120/150 | 80/20 | 1.25 | 0.5 | 62.3 | pass | 39.8 | 8→7.35ma no wash off | — | — | 60 | 10.6 | slightly grainy |
| 8 | Ven. 120/150 | 70/30 | 1.25 | 0.5 | 62.4 | pass | 31.3 | 8→6.8 ma no wash off | — | — | 120 | 10.6 | slightly grainy |
| 9 | Ven. 120/150 | 60/40 | 1.25 | 0.1 | 63.5 | pass | 34.0 | 8→7.6 ma no wash off | — | — | 420+ | 10.0 | slightly grainy |
| 10 | Ven. 120/150 | 70/30 | 1.50 | 0.5 | 62.2 | pass | 38.9 | 8→7.8 ma no wash off | — | — | 120 | 10.5 | slightly grainy |

The results shown in the table show that satisfactory anionic asphalt emulsions can be made with the anionic emulsifier of the subject invention.

EXAMPLE 2

This example illustrates emulsions made varying the weight of nonyl phenol adduct to lignin salt and showing the effect of the addition of borax on pumping time. The emulsions were made with 120/150 penetration Venezuelan asphalt using an emulsifier dosage of 1.0% at pH 11.0 and an asphalt level of 62%. The lignin used was a sodium salt of kraft pine lignin. The pumping time results were:

TABLE II

| Weight Ratio | | | Pumping Time | |
|---|---|---|---|---|
| Alkali Lignin Salt | Borax | Nonyl Phenol Adduct | Minutes | Seconds |
| 70 | 0 | 30 | 3' | 30" |
| 65 | 0 | 35 | 4' | 40" |
| 60 | 0 | 40 | 4' | 30" |
| 60 | 5 | 35 | 7' | 00" |
| 55 | 5 | 40 | 37' | 00" |
| 55 | 10 | 35 | 9' | 20" |
| 56 | 5 | 39 | 22' | 30" |

The results clearly show the unexpected increase on pumping time with the addition of sodium borate to the emulsion.

While the invention has been described and illustrated herein by references to various specific materials, procedures, and examples, it is understood that the invention is not restricted to the particular materials, combinations of materials, and procedures selected for that purpose.

What is claimed is:

1. An oil-in-water anionic bituminous emulsion which comprises;
   (a) from about 30% to about 75% by weight of the emulsion of bitumen as the disperse phase, (b) from about 0.1% to about 10.0% by weight of the anionic emulsifier consisting of the alkali metal salt of an alkali lignin wherein said alkali metal salt is formed from a member of the group of alkali metals consisting of sodium, potassium and lithium and the ethylene oxide adduct of an alkyl phenol wherein said alkyl phenol is nonyl phenol, octyl phenol or dodecyl phenol in a weight ratio of 10:1 to 1:10 of lignin to said alkyl phenol adduct, and (c) water in an amount to make up 100% by weight as the continuous phase.

2. An oil-in-water anionic emulsion as defined in claim 1 wherein said bitumen is asphalt in an amount from about 55% to about 65% by weight.

3. An oil-in-water anionic emulsion as defined in claim 1 wherein the pH of the emulsion is adjusted to between about 10 and 12 prior to using.

4. An oil-in-water anionic emulsion as defined in claim 1 wherein said anionic emulsifier is present in an amount from about 0.5% to about 3.0% and said lignin to alkyl phenol adduct ratio is between 7:3 and 4:6 by weight.

5. An oil-in-water anionic emulsion as defined in claim 1 wherein said alkali metal salt of alkali lignin is the sodium salt of kraft pine lignin.

6. An oil-in-water anionic emulsion as defined in claim 1 wherein said alkyl phenol is nonyl phenol and the adduct contains from 10 moles to 100 moles of ethylene oxide.

7. An oil-in-water anionic emulsion as defined in claim 6 wherein said nonyl adduct contains from 30 moles to 50 moles of ethylene oxide.

8. An oil-in-water anionic bituminous emulsion which comprises;

(a) from about 30% to about 75% by weight of the emulsion of bitumen as the disperse phase, (b) from about 0.1% to about 10.0% by weight of the anionic emulsifier consisting of the alkali metal salt of an alkali lignin wherein said alkali metal salt is formed from a member of the group of alkali metals consisting of sodium, potassium and lithium and the ethylene oxide adduct of an alkyl phenol wherein said alkyl phenol is nonyl phenol, octyl phenol or dodecyl phenol in a weight ratio of 10:1 to 1:10 of lignin to said alkyl phenol adduct, and from 1% to about 10% by weight sodium borate, and (c) water in an amount to make up 100% by weight as the continuous phase.

9. An oil-in-water anionic emulsion as defined in claim 8 wherein said sodium borate is present in an amount from about 1% to about 5% by weight.

10. An oil-in-water anionic emulsion as defined in claim 8 wherein said bitumen is asphalt in an amount from about 55% to about 65% by weight.

11. An oil-in-water anionic emulsion as defined in claim 8 wherein the pH of the emulsion is adjusted to between about 10 and 12 prior to using.

12. An oil-in-water anionic emulsion as defined in claim 8 wherein said anionic emulsifier is present in an amount from about 0.5% to about 3.0% and said lignin to alkyl phenol adduct ratio is between 7:3 and 4:6 by weight.

13. An oil-in-water anionic emulsion as defined in claim 8 wherein said alkali metal salt of alkali lignin is the sodium salt of kraft pine lignin.

14. An oil-in-water anionic emulsion as defined in claim 8 wherein said alkyl phenol is nonyl phenol and the adduct contains from 10 moles to 100 moles of ethylene oxide.

15. An oil-in-water anionic emulsion as defined in claim 14 wherein said nonyl adduct contains from 30 moles to 50 moles of ethylene oxide.

* * * * *